United States Patent
Sharma et al.

(10) Patent No.: US 10,823,671 B2
(45) Date of Patent: Nov. 3, 2020

(54) GAS DETECTOR AND METHOD OF DETECTION

(71) Applicant: General Electric Comany, Schenectady, NY (US)

(72) Inventors: Rachit Sharma, Bangalore (IN); David Kelly Moyeda, Lake Forest, CA (US); Chayan Mitra, Bangalore (IN); Arun Kumar Sridharan, Bangalore (IN); Anish Bekal, Bangalore (IN); Eric YuHang Fung, Houston, TX (US)

(73) Assignee: General Electric Company, Schenectady, NY (US)

( * ) Notice: Subject to any disclaimer, the term of this patent is extended or adjusted under 35 U.S.C. 154(b) by 256 days.

(21) Appl. No.: 15/761,148

(22) PCT Filed: Dec. 22, 2015

(86) PCT No.: PCT/US2015/067322
§ 371 (c)(1),
(2) Date: Mar. 19, 2018

(87) PCT Pub. No.: WO2017/065815
PCT Pub. Date: Apr. 20, 2017

(65) Prior Publication Data
US 2018/0259448 A1    Sep. 13, 2018

(30) Foreign Application Priority Data

Oct. 17, 2015   (IN) ............................ 5573/CHE/2015

(51) Int. Cl.
*G01N 21/39*       (2006.01)
*G01N 21/3504*   (2014.01)
(Continued)

(52) U.S. Cl.
CPC ........... *G01N 21/39* (2013.01); *F01N 3/2066* (2013.01); *G01N 21/0332* (2013.01);
(Continued)

(58) Field of Classification Search
CPC .... Y02T 10/24; G01N 21/3504; G01N 21/39; G01N 21/031; G01N 21/0332;
(Continued)

(56) References Cited

U.S. PATENT DOCUMENTS 5,925,881 A    7/1999  Wahlbrink
6,615,678 B2   9/2003  Yamagishi et al.
(Continued)

FOREIGN PATENT DOCUMENTS

CA    2 886 213 A1    5/2015
EP    1 398 617 A1    3/2004
(Continued)

OTHER PUBLICATIONS

"Exhaust gas," Wikipedia, Retrieved from the Internet URL: https://en.wikipedia.org/wiki/Exhaust_gas, on Jul. 5, 2016, pp. 1-9 (Nov. 5, 2014).
(Continued)

*Primary Examiner* — Mischita L Henson
(74) *Attorney, Agent, or Firm* — James Pemrick; Hoffman Warnick LLC (57) ABSTRACT

One or more light sources emit light within first, second, and third wavelength ranges through exhaust gas. The first and second wavelength ranges are characterized by first and second different absorption wavelength ranges of a background gas. The third wavelength range is characterized by an absorption wavelength range of a gas-of-interest. At least some of the light within the first, second, and third wavelength ranges is absorbed by the exhaust gas thereby providing modified light characterized by the first, second, and
(Continued)

third absorption wavelength ranges. One or more detectors receive the modified light. A processing subsystem determines a temperature of the exhaust gas based on the modified light characterized by the first and second absorption wavelength ranges and a concentration of the gas-of-interest based on the modified light characterized by the third absorption wavelength range and the temperature of the exhaust gas.

17 Claims, 6 Drawing Sheets (51) Int. Cl.
  *G01N 21/03* (2006.01)
  *G01N 21/31* (2006.01)
  *F01N 3/20* (2006.01)
  *G01N 21/01* (2006.01)

(52) U.S. Cl.
  CPC ......... *G01N 21/31* (2013.01); *G01N 21/3504* (2013.01); *F01N 2560/02* (2013.01); *F01N 2560/022* (2013.01); *F01N 2560/026* (2013.01); *F01N 2560/06* (2013.01); *F01N 2560/12* (2013.01); *G01N 21/031* (2013.01); *G01N 2021/0193* (2013.01); *G01N 2021/399* (2013.01); *Y02T 10/24* (2013.01)

(58) Field of Classification Search
  CPC ........... G01N 21/31; G01N 2021/0193; G01N 2021/399; F01N 3/2066; F01N 2560/02; F01N 2560/022; F01N 2560/026; F01N 2560/06
  See application file for complete search history.

(56) References Cited

U.S. PATENT DOCUMENTS

| | | |
|---|---|---|
| 7,029,920 B2 | 4/2006 | Lanier et al. |
| 7,283,243 B2 | 10/2007 | Langford et al. |
| 8,625,098 B2 | 1/2014 | Li et al. |
| 8,702,302 B2 | 4/2014 | Badami et al. |
| 8,825,214 B2 | 9/2014 | Haffner |
| 2002/0158202 A1 | 10/2002 | Webber et al. |
| 2009/0164138 A1 | 6/2009 | Goto et al. |
| 2010/0067014 A1 | 3/2010 | Howieson |
| 2011/0056416 A1 | 3/2011 | Widmer et al. |
| 2011/0067408 A1 | 3/2011 | Maly et al. |

FOREIGN PATENT DOCUMENTS

| | | |
|---|---|---|
| EP | 1398617 A1 | 3/2004 |
| EP | 1 860 425 A1 | 11/2007 |
| JP | 2000-214077 A | 8/2000 |
| JP | 2006-337326 A | 12/2006 |
| JP | 2007040995 A | 2/2007 |
| WO | 2011/114096 A3 | 11/2011 |

OTHER PUBLICATIONS

"LaserGas™ II Multipass Monitor," Neo Monitors, pp. 1-2 (Aug. 2004).
Pavri, R., et al., "Gas Turbine Emissions and Control," GER-4211, pp. 1-35 (2001).
"Tunable Diode Laser Spectroscopy Analyzer," TDLS200, Yokogawa 5th Edition, pp. 1-40 (Jun. 5, 2012).
Mitra, C., et al., Gas detector and method of detection, GE Co-Pending Application No. 2377/CHE/2014, filed on May 12, 2014.
International Search Report and Written Opinion issued in connection with corresponding PCT Application No. PCT/US2015/067322 dated Jul. 20, 2016.
International Preliminary Report on Patentability issued in connection with corresponding PCT Application No. PCT/US2015/067322 dated Apr. 17, 2018.

GAS DETECTOR AND METHOD OF DETECTION

BACKGROUND

In gas turbine-based power generation plants, a gas turbine converts energy of hot pressurized combustion gases into mechanical energy by rotation of a rotor shaft of the gas turbine. In some embodiments, the mechanical energy is utilized to generate electricity via a generator. The operation of such gas turbines results in generation of exhaust or residual gases which, in some configurations, are exhausted into the atmosphere through a chamber of a selective catalytic reduction unit (SCR) or a heat recovery steam generator (HRSG) and a stack. An exhaust gas includes a plurality of constituents, wherein some constituents may be gases that can be potentially hazardous to the atmosphere. Therefore, there is a need to identify the constituents of the exhaust gas and measure concentration of the constituents to control the nature of the exhaust gases that are released into the environment.

Currently, extractive techniques are available for identifying the constituents of the exhaust gases and measuring concentration of the constituents in the exhaust gases. The extractive techniques involve extracting a sample of the exhaust gases and conveying the sample to analyzers through sample lines. Further, an analysis of the exhaust gases is performed to identify the constituents present in the exhaust gas and measure the concentration of the constituents using offline measurement techniques such as infrared and/or ultraviolet absorption measurements of each species. Unfortunately, there is a significant delay between the time of extraction of the sample of exhaust gases and the analysis of the exhaust gases. The delay results in variation in temperature of the sample which sometimes results in inaccurate measurements.

Accordingly, there is a need for improved methods and systems to identify the constituents present in the exhaust gas and measure the concentration of the constituents.

BRIEF DESCRIPTION

A system is presented. The system includes an exhaust-gas-duct configured to receive an exhaust gas comprising a gas-of-interest and a background gas, one or more light sources operatively coupled to the exhaust-gas-duct and configured to emit light within first, second, and third wavelength ranges, through the exhaust gas, wherein the first wavelength range is characterized by a first absorption wavelength range of the background gas, wherein the second wavelength range is characterized by a second absorption wavelength range of the background gas, wherein the first and second wavelength ranges are not identical, and wherein the third wavelength range is characterized by an absorption wavelength range of the gas-of-interest, one or more detectors operatively coupled to the exhaust-gas-duct and configured to receive the light that has traversed through the exhaust gas from the one or more light sources, wherein at least some of the light within the first, second, and third wavelength ranges is absorbed by the exhaust gas thereby providing modified light for detection characterized by the first, second, and third absorption wavelength ranges, and a processing subsystem communicatively coupled to the one or more detectors and configured to determine a temperature of the exhaust gas based on the modified light characterized by the first and second absorption wavelength ranges and to determine a concentration of the gas-of-interest based on the modified light characterized by the third absorption wavelength range and the determined temperature of the exhaust gas.

A method is presented. The method includes receiving an exhaust gas comprising a gas-of-interest and a background gas, emitting light through the exhaust gas, wherein the light is within first, second, and third wavelength ranges, wherein the first wavelength range is characterized by a first absorption wavelength range of the background gas, the second wavelength range is characterized by a second absorption wavelength range of the background gas, wherein the first and second absorption wavelength ranges are not identical, and wherein the third wavelength range is characterized by a third absorption wavelength range of the gas-of-interest, receiving light that has traversed through the exhaust gas, wherein at least some of the light within the first, second, and third wavelength ranges is absorbed by the exhaust gas thereby providing modified light for detection within the first, second, and third absorption wavelength ranges, and determining a temperature of the exhaust gas based on the modified light characterized by the first and second absorption wavelength ranges and determining a concentration of the gas-of-interest based on the modified light characterized by the third absorption wavelength range and the determined temperature of the exhaust gas.

A system is presented. The system includes an exhaust-gas-duct configured to receive an exhaust gas comprising water, water vapor and nitrogen oxide, one or more light sources operatively coupled to the exhaust-gas-duct and configured to emit light within first, second, and third wavelength ranges, through the exhaust gas, wherein the first wavelength range is characterized by a first absorption wavelength range of the water or water vapor, wherein the second wavelength range is characterized by a second absorption wavelength range of the water or water vapor, wherein the first and second wavelength ranges are not identical, and wherein the third wavelength range is characterized by a third absorption wavelength range of the nitrogen oxide, one or more detectors operatively coupled to the exhaust-gas-duct and configured to receive the light that has traversed through the exhaust gas from the one or more light sources, wherein at least some of the light within the first, second, and third wavelength ranges is absorbed by the exhaust gas thereby providing modified light for detection characterized by the first, second, and third absorption wavelength ranges, and a processing subsystem communicatively coupled to the one or more detectors and configured to determine a temperature of the exhaust gas based on the modified light characterized by the first and second absorption wavelength ranges and to determine a concentration of the nitrogen oxide based on the modified light characterized by the third absorption wavelength range and the determined temperature of the exhaust gas.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components which are either active and/or passive and are connected or otherwise coupled together to provide the described function or functions.

The present systems and methods analyze a gas-mixture to determine presence or absence of one or more gases-of-interest in the gas-mixture. The present systems and methods are configured to accurately analyze the gas-mixture in harsh environments characterized by high temperature or pressure. The present systems and methods analyze the gas-mixture in real-time relative to the time of generation of the gas-mixture such that temperature of the gas-mixture is maintained while analyzing the gas-mixture or transferring the gas-mixture for analysis. The gas-mixture, for example, may be analyzed to identify chemical species including but not limited to NO, $NO_2$, CO, $CO_2$, $SO_2$, and $H_2O$ present in the gas-mixture.

Figure 1:
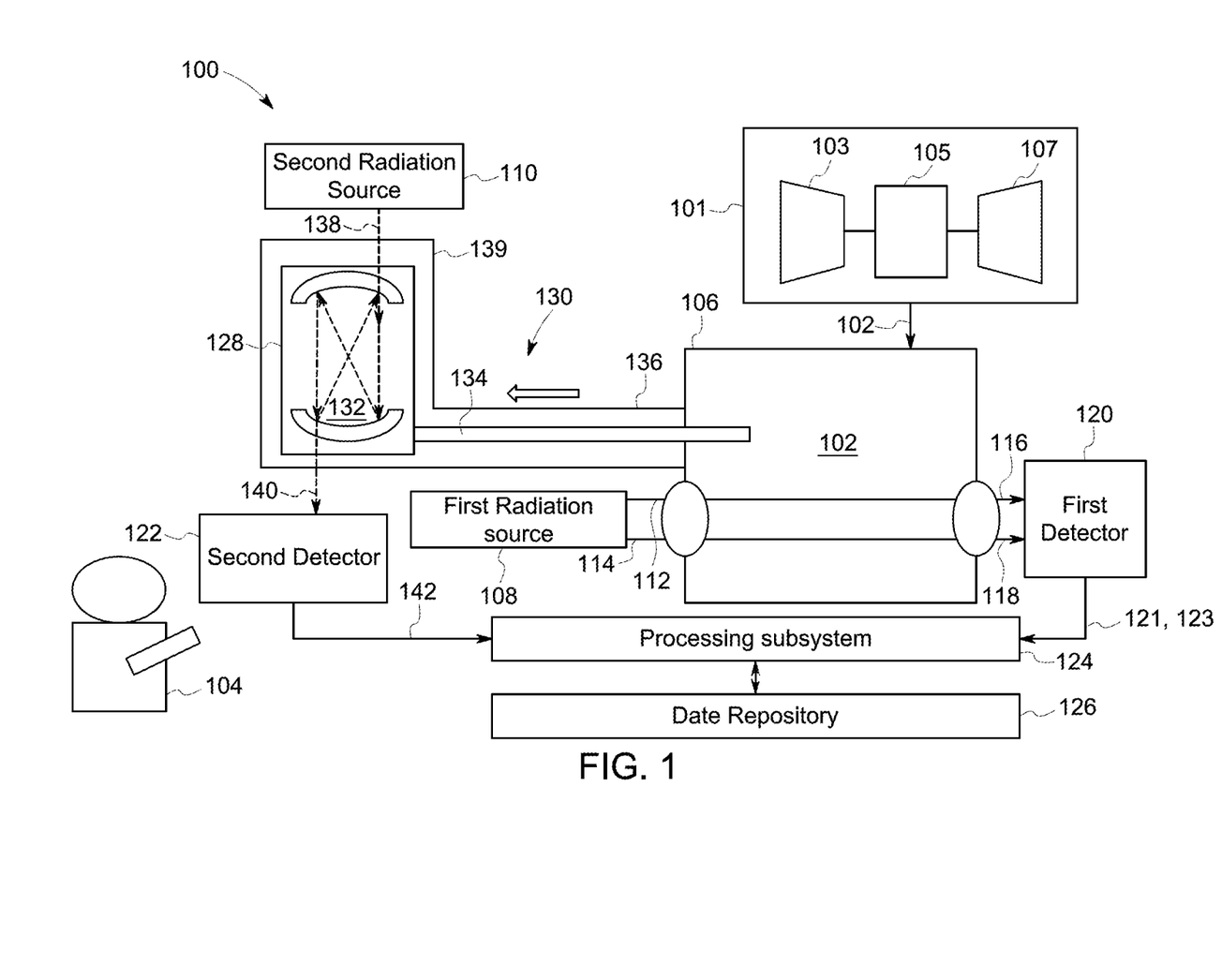
FIG. 1 is a block diagram of a system to analyze an exhaust gas in accordance with one embodiment of the present invention.

FIG. 1 is a block diagram of a system 100 configured to analyze an exhaust gas 102 in accordance with one embodiment of the present invention. The system 100, for example, includes a device 101 that emits the exhaust gas 102. In the embodiment of FIG. 1, the device 101 is a gas turbine. The gas turbine 101, for example include a compressor 103, a combustor 105 and a turbine 107. The exhaust gas 102, for example, may be a mixture of two or more constituent gases. The exhaust gas 102, for example, may be analyzed to determine a presence or absence of a gas-of-interest (not shown) in the exhaust gas 102. The exhaust gas 102 may further be analyzed to determine a concentration of the gas-of-interest in the exhaust gas 102. As used herein, the term "gas-of-interest" refers to a gas that may or may not be present in the exhaust gas and is of interest to a user 104. In one embodiment, for example, the gas-of-interest may comprise nitrogen oxide.

The user 104 may select one or more of the constituent gases in the exhaust gas, as a background gas (not shown) for determining a temperature of the exhaust gas 102. In one embodiment, for example, the background gas may comprise $H_2O$. As used herein, the term "background gas" refers to a constituent gas that is present in the exhaust gas. In one embodiment, a concentration of the background gas is at least 2%. It should be noted herein that the background gas is different from the gas-of-interest.

The system 100 includes an exhaust-gas-duct 106 and first and second light sources 108, 110. It should be noted herein that while the exhaust-gas-duct 106 is shown as a separate device from the device 101, in certain embodiments, the exhaust-gas-duct 106 may be a portion of the device 101. The number of light sources may vary depending on the application. The exhaust-gas-duct 106, for example, is configured to receive the exhaust gas 102 from the device 101. The exhaust-gas-duct 106, for example, may comprise a selective catalytic reduction unit, a stack chimney, a heat recovery steam generator, or a combination thereof.

The first and second light sources 108, 110, for example, may comprise a coherent source, an incoherent source, a visible light source, an infrared source, or the like. Several examples of a coherent source include a tunable laser source, a diode laser, a laser, a distributed feedback laser source, a Quantum cascade laser source, or the like. One example of an incoherent source is a Light Emitting Diode (LED). The first and second light sources 108, 110 are configured to emit light through exhaust gas 102 or a portion of the exhaust gas 102. The first and second light sources 108, 110 are configured to emit light of three wavelength ranges including a first wavelength range, a second wavelength range and a third wavelength range. The first wavelength range, the second wavelength range, and the third wavelength range are not identical. In the embodiment of FIG. 1, the first light source 108 is configured to emit a light within the first wavelength range 112 and a light within the second wavelength range 114. In one embodiment, the light within the first wavelength range 112 and the light within the second wavelength range 114 may be combined into a single light beam. The first wavelength range is characterized a first absorption wavelength range of the background gas and the second wavelength range is characterized by a second absorption wavelength range of the background gas. The first absorption wavelength range is different from the second wavelength absorption range. As used herein, the term "absorption wavelength range of a gas" refers to a wavelength or a wavelength range of light, wherein irradiation of the gas by the light within the wavelength range results in absorption of photons of the light. It should be noted herein that the first light source 108 may emit the light within the first wavelength range 112 and the light within the second wavelength range 114 at different time stamps. In other words, the first light source 108 may emit the light within the first wavelength range 112 at a first time stamp $t_1$ and the light within the second wavelength range 114 at a second time stamp $t_2$.

The first light source 108 is operatively coupled to the exhaust-gas-duct 106. Particularly, the first light source 108 is configured to emit and direct the light within the first wavelength range 112 and the light within the second wavelength range 114 into the exhaust-gas-duct 106. In some embodiments, the light within the first wavelength range 112 and the light within the second wavelength range 114 may be part of a single light beam though characterized by different wavelength ranges including the first wavelength range and the second wavelength range.

Furthermore, the exhaust-gas-duct 106 is configured to receive the light within the first wavelength range 112 and the light within the second wavelength range 114 to irradiate the exhaust gas 102. The irradiation of the exhaust gas 102 results in absorption of at least some photons by the exhaust gas 102. Particularly, since the light within the first wavelength range 112 is characterized by the first absorption wavelength range of the background gas present in the exhaust gas 102, the background gas absorbs at least some photons of the light within the first wavelength range 112.

Similarly, since the light within the second wavelength range 114 is characterized by the second absorption wavelength range of the background gas, the background gas absorbs at least some photons of the light within the second wavelength range 114.

The absorption of the photons of the light within the first wavelength range 112 and light within the second wavelength range 114 by the background gas alters one or more characteristics of the light within the first wavelength range 112 and the light within the second wavelength range 114. The characteristics, for example, may include an intensity of the light within the first wavelength range 112 and the light within the second wavelength range 114. For example, the absorption of the photons of the light within the first wavelength range 112 may reduce the intensity of the light within the first wavelength range 112. Hereinafter, the light within the first wavelength range 112 that has traversed through the exhaust gas 102 which alters the characteristics of the light within the first wavelength range 112, shall be referred to as a first modified light 116. Again, the light within the second wavelength range 114 that has traversed through the exhaust gas 102 which alters the characteristics of the light within the second wavelength range 114, shall be referred to as a second modified light 118. Accordingly, the irradiation of the exhaust gas 102 by the light within the first wavelength range 112 results in generation of the first modified light 116 and the irradiation of the exhaust gas 102 by the light within the second wavelength range 114 results in generation of the second modified light 118. The exhaust-gas-duct 106 is further configured to emit the first modified light 116 and the second modified light 118 outwards from the exhaust-gas-duct 106. The first modified light 116 is characterized by the first absorption wavelength range and the second modified light 118 is characterized by the second absorption wavelength range.

In the embodiment of FIG. 1, the system 100 further includes a first detector 120 and a second detector 122. The first detector 120 is operationally coupled to the exhaust-gas-duct 106 and configured to receive the first modified light 116 and the second modified light 118 from the exhaust-gas-duct 106. The first detector 120 is further configured to determine an intensity 121 of the first modified light 116 and an intensity 123 of the second modified light 118. Although a single detector block 120 is shown as receiving the first modified light 116 and the second modified light 118 for purposes of illustration, the number of detectors may vary depending on the application.

The system 100 further includes a processing subsystem 124 that is operationally coupled to the first detector 120, the second detector 122, and a data repository 126. The processing subsystem 124 includes at least one arithmetic logic unit, a microprocessor, a general purpose controller or a processor array to perform the desired computations or run the computer program. The data repository 126 may be a non-transitory storage medium. For example, the data repository 126 may be a dynamic random access memory (DRAM) device, a static random access memory (SRAM) device, flash memory or other memory devices. In one embodiment, the data repository 126 may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices.

The processing subsystem 124 is configured to determine a temperature of the exhaust gas 102 based on the first modified light 116 and the second modified light 118. In one embodiment, the processing subsystem 124 is configured to receive the intensity 121 of the first modified light 116 and the intensity 123 of the second modified light 118 from the first detector 120 and compute the temperature based on the intensity 121 of the first modified light 116 and the intensity 123 of the second modified light 118. Hereinafter, the temperature of the exhaust gas 102 contained in the exhaust-gas-duct 106 shall be referred to as "determined temperature." Computation/determination of the determined temperature shall be explained in greater detail below with reference to FIG. 5.

The system 100 of FIG. 1 further includes an absorption cell 128. The absorption cell 128, for example, may be a single-pass absorption cell or a multi-pass absorption cell. It is noted that in the embodiment of FIG. 1, the absorption cell 128 is located outside the exhaust-gas-duct 106. In alternative embodiments, either the absorption cell 128 may be located inside the exhaust-gas-duct 106 or the exhaust-gas-duct 106 may be configured to additionally act as the absorption cell 128. An example of a system wherein an absorption cell is located inside an exhaust-gas-duct is shown and explained in detail with reference to FIG. 2.

In the embodiment of FIG. 1, the system 100 additionally includes a coupling unit 130. The coupling unit 130 couples the absorption cell 128 to the exhaust-gas-duct 106. The coupling unit 130 is configured to transfer and direct at least a portion 132 of the exhaust gas 102 from the exhaust-gas-duct 106 into the absorption cell 128. The coupling unit 130 is further configured to maintain the portion 132 of exhaust gas 102 at a temperature level substantially equal to the determined temperature of the exhaust gas 102 while the portion 132 of the exhaust gas 102 is being transferred from the exhaust-gas-duct 106 to the absorption cell 128. In the presently contemplated configuration, the coupling unit 130 includes a tube 134 and a first temperature control unit 136. The tube 134 extends from the exhaust-gas-duct 106 to the absorption cell 128 and is configured to transfer the portion 132 of the exhaust gas 102 from the exhaust-gas-duct 106 to the absorption cell 128. Hereinafter, the phrase "portion 132 of exhaust gas 102" shall be referred to as the "exhaust gas portion 132".

The first temperature control unit 136 is configured to maintain the temperature of the exhaust gas portion 132 at a temperature level substantially equal to the determined temperature of the exhaust gas 102 while the exhaust gas portion 132 is being transferred from the exhaust-gas-duct 106 to the absorption cell 128 via the tube 134. In one embodiment, the first temperature control unit 136 comprises a passive unit such as an insulator, for example. In certain other embodiments, the first temperature control unit 136 includes an active electrical/electronic temperature control device coupled to the processing subsystem 124. For example, the first temperature control unit 136 may comprise a wrap-around heating element. In such embodiments, the active electrical/electronic temperature control unit is configured to receive the determined temperature from the processing subsystem 124 and actively maintain the exhaust gas portion 132 at the determined temperature.

Furthermore, the absorption cell 128 is configured to receive and contain the exhaust gas portion 132 from the exhaust-gas-duct 106. The absorption cell 128 is also further configured to maintain the exhaust gas portion 132 at a temperature level substantially equal to the determined temperature of the exhaust gas 102. In the presently contemplated configuration, the absorption cell 128 comprises a second temperature control unit 139 that is configured to maintain the exhaust gas portion 132 contained within the absorption cell 128 at a temperature level substantially equal to the determined temperature of the exhaust gas 102. For example, the second temperature control unit 139 may comprise an insulator. It is noted that while the second temperature control unit 139 may comprise a passive unit, in certain embodiments, the second temperature control unit 139 may comprise an active electrical/electronic temperature control unit coupled to the processing subsystem 124. For example, the second temperature control unit 139 may comprise a wrap-around heating element. In such embodiments, the active electrical/electronic temperature control unit 138 may receive the determined temperature from the processing subsystem 124, and actively maintain the exhaust gas portion 132 at the determined temperature.

The absorption cell 128 is operationally coupled to the second light source 110 and the second detector 122. The second light source 110 is configured to emit and direct a light within the third wavelength range 138 into the absorption cell 128. The third wavelength range is characterized by an absorption wavelength range of the gas-of-interest. Furthermore, the absorption cell 128 is configured to receive the light within the third wavelength range 138 to irradiate the exhaust gas portion 132. The irradiation of exhaust gas portion 132 results in absorption of at least some photons of the light within the third wavelength range 138 by the exhaust gas portion 132. Particularly, since the light within the third wavelength range 138 is characterized by the absorption wavelength range of the gas-of-interest present in the exhaust gas portion 132, the gas-of-interest absorbs at least some photons of the light within the third wavelength range 138.

The absorption of the photons of the light within the third wavelength range 138 by the gas-of-interest alters one or more characteristics of the light within the third wavelength range 138. The characteristics, for example, may include an intensity of the light within the third wavelength range 138. For example, the absorption of the photons of the light within the third wavelength range 138 may reduce the intensity of the light within the third wavelength range 138. Hereinafter, the light within the third wavelength range 138 characterized by the altered characteristic shall be referred to as a third modified light 140. Accordingly, irradiation of the exhaust gas portion 132 by the light within the third wavelength range 138 results in emission of the third modified light 140. The third modified light 140 is characterized by a third absorption wavelength range The absorption cell 128 is configured to emit the third modified light 140 outwards from the absorption cell 128.

As previously noted, the system 100 includes the second detector 122. The second detector 122 is operationally coupled to the absorption cell 128 and the processing subsystem 124. The second detector 122 is configured to receive the third modified light 140 from the absorption cell 128. The second detector 122 is further configured to determine an intensity 142 of the third modified light 140. The processing subsystem 124 is also configured to receive the intensity 142 of the third modified light 140 from the second detector 122.

In the presently contemplated configuration, the processing subsystem 124 is programmed to perform analysis at least based on the third modified light 140 and the determined temperature of the exhaust gas 102. Particularly, the processing subsystem 124 is configured to determine a concentration of the gas-of-interest based on the third modified light 140 and the determined temperature of the exhaust gas 102. For example, the processing subsystem 124 may determine the concentration of the gas-of-interest based on the intensity 142 of the third modified light 140 and determined temperature of the exhaust gas 102. In one example, a calibration method may be used to determine the concentration of the gas-of-interest based on the determined temperature and the intensity 142 of the third modified light 140. For example, the processing subsystem 124 may apply Beer Lambert law to measure the concentration of the gas-of-interest. An example of the Beer Lambert law is shown below:

$$I = I_0 e^{-\alpha CL}$$

wherein I is the intensity 142 of the third modified light 140, $I_0$ is an intensity of the light within the third wavelength range 138, C is the concentration of the gas-of-interest, L is path length of the light within the third wavelength range 138, and $\alpha$ is an absorbance coefficient that is a function of the determined temperature of the exhaust gas 102.

Figure 2:
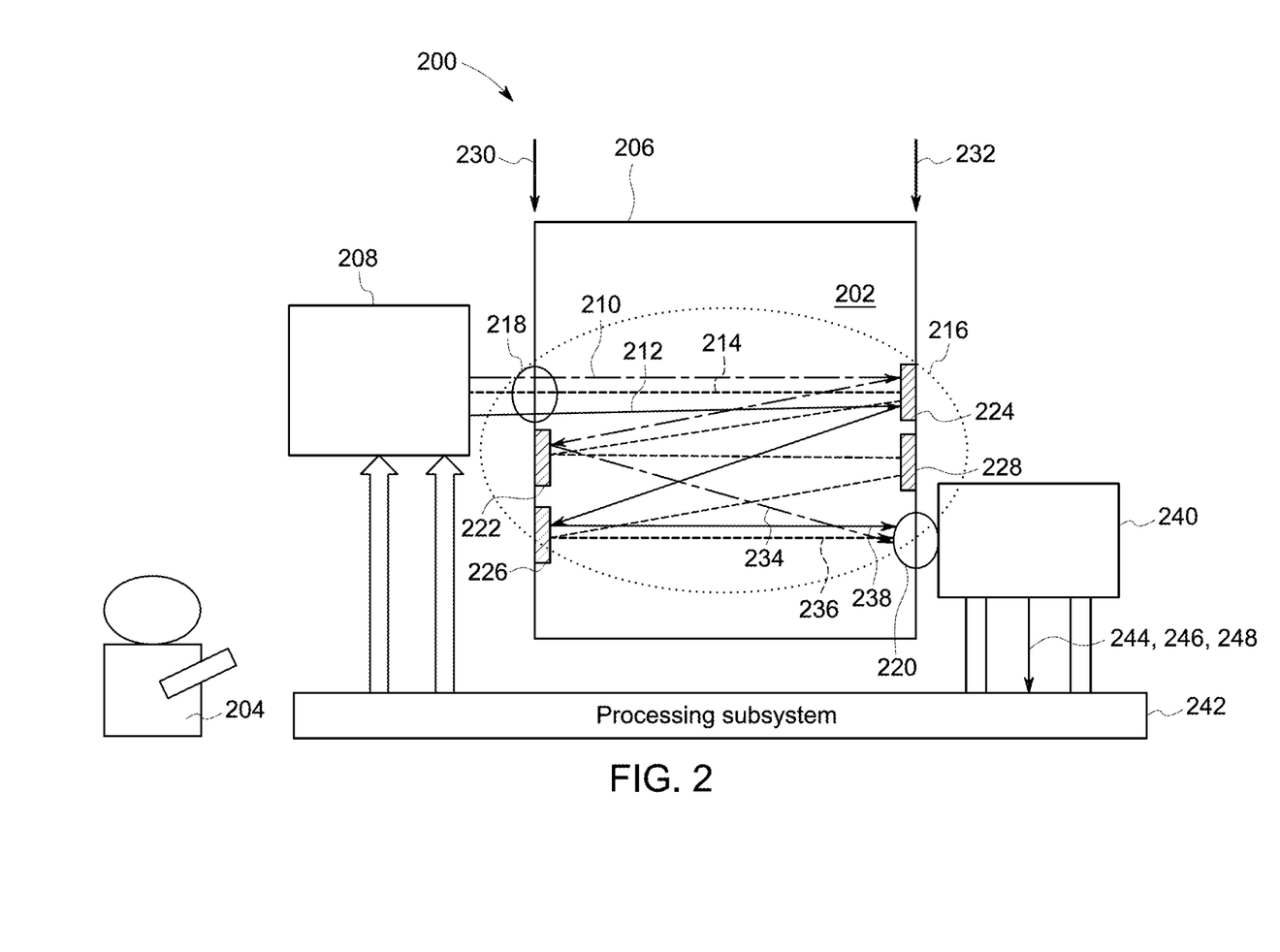
FIG. 2 is a block diagram of a system to analyze an exhaust gas in accordance with another embodiment of the present invention.

FIG. 2 is a block diagram of a system 200 configured to analyze an exhaust gas 202 in accordance with another embodiment of the present invention. The exhaust gas 202, for example, may comprise a mixture of two or more constituent gases (not shown). The system 200 is configured to analyze the exhaust gas 202 to determine a presence or absence of a gas-of-interest (not shown) in the exhaust gas 202. The exhaust gas 202 may be further analyzed to determine a concentration of the gas-of-interest in the exhaust gas 202.

The system 200 further includes an exhaust-gas-duct 206 and a light source 208. The exhaust-gas-duct 206, for example, may receive the exhaust gas 202 from a device (not shown). It is noted that while FIG. 1 does not show the exhaust-gas-duct as being a part/component of the device, the exhaust-gas-duct 206 may be a component of the device or may be operationally coupled to the device. The exhaust-gas-duct 206, for example, may include a selective catalytic reduction unit, a stack chimney, a heat recovery steam generator, or a combination thereof. The device, for example, may comprise a gas turbine or the like.

The light source 208 may comprise a device such as described above with respect to the first light source 108, for example. The light source 208 is configured to emit a light within the first wavelength range 210, a light within the second wavelength range 212, and a light within the third wavelength range 214. The light within the first wavelength range 210 is characterized by a first absorption wavelength range of the background gas and the light within the second wavelength range 212 is characterized by a second absorption wavelength range of the background gas. The first absorption wavelength range is different from the second wavelength absorption range.

Furthermore, the light within the third wavelength range 214 is characterized by an absorption wavelength range of the gas-of-interest. It should be noted herein that the light source 208 may emit the light within the first wavelength range 210, the light within the second wavelength range 212, and the light within the third wavelength range 214 at different time stamps. In other words, the light source 208 may emit the light within the first wavelength range 210 at a first time stamp $t_1$, the light within the second wavelength range 212 at a second time stamp $t_2$, and the light within the third wavelength range at a third time stamp $t_3$. The first absorption wavelength range, the second absorption wavelength range, and the absorption wavelength range of the gas-of-interest may be different from each other. In the illustrated embodiment, light source 208 is configured to emit three different light beams within three different wavelength ranges (i.e. first wavelength range, second wavelength range and third wavelength range) characterized by three different corresponding absorption wavelength ranges. In certain other embodiments, the light source 208 may emit a single light beam comprising the light within the first wavelength range 210, the light within the second wavelength range 212, and the light within the third wavelength range 214 characterized by the three different corresponding absorption wavelength ranges. In other words, the light within the first wavelength range 210, the light within the second wavelength range 212, and the light within the third wavelength range 214 may be a part of the single light beam emitted by the light source 208.

The system 200 further includes an absorption cell 216. The absorption cell 216, for example, may be a multi-pass absorption cell or a single-pass absorption cell. In the illustrated embodiment, the absorption cell 216 is located inside the exhaust-gas-duct 206. Particularly, in the presently contemplated configuration, the exhaust-gas-duct 206 is additionally configured to act as the absorption cell 216. For example, in the embodiment of FIG. 2, the absorption cell 216 includes first and second windows 218, 220, and first, second, third, and fourth mirrors 222, 224, 226, 228 disposed inside the exhaust-gas-duct 206. The number of windows and mirrors (if included) may vary depending on the application. The first mirror 222 and the third mirror 226 are located on a first side 230 of the exhaust-gas-duct 206 and the second mirror 224 and the fourth mirror 228 are located on a second side 232 of the exhaust-gas-duct 206. The first side 230 and the second side 232 of the exhaust-gas-duct 206 are formed opposite to each other. The first, second, and third light beams 210, 212, 214 may or may not come in contact with each of the mirrors depending upon the trajectory of the light beams.

The light source 208 is in an operational communication with the exhaust-gas-duct 206 and the absorption cell 216. Particularly, the light source 208 is configured to emit and direct the light within the first wavelength range 210, the light within the second wavelength range 212, and the light within the third wavelength range 214 into the exhaust-gas-duct 206 and the absorption cell 216. Furthermore, the exhaust-gas-duct 206 and the absorption cell 216 are configured to receive the light within the first wavelength range 210, the light within the second wavelength range 212, and light within the third wavelength range 214 into exhaust-gas-duct 206 and the absorption cell 216 via the first window 218 to irradiate the exhaust gas 202.

The light within the first wavelength range 210, the light within the second wavelength range 212, and the light within the third wavelength range 214 are subjected to a plurality of reflections within the absorption cell 216 located inside the exhaust-gas-duct 206. Particularly, the light within the first, second and third wavelength ranges 210, 212, 214 are reflected between the four mirrors 222, 224, 226, 228 of the absorption cell 216. The direction of the light within the first, second, and third wavelength ranges 210, 212, 214, and the reflections of the light within the first, second, and third wavelength ranges 210, 212, 214 within the absorption cell 216 and the exhaust-gas-duct 206 results in irradiation of the exhaust gas 202.

The irradiation of the exhaust gas 202 results in absorption of at least some photons of the light within the first wavelength range 210, the light within the second wavelength range 212, and the light within the third wavelength range 214 by the exhaust gas 202. Particularly, since the light within the first wavelength range 210 is characterized by the first absorption wavelength range of the background gas present in the exhaust gas 202, the background gas absorbs at least some photons of the light within the first wavelength range 210. Similarly, since the light within the second wavelength range 212 is characterized by the second absorption wavelength range of the background gas, the background gas absorbs at least some photons of the light within the second wavelength range 212. Again, since the light within the third wavelength range 214 is characterized by the absorption wavelength range of the gas-of-interest present in the exhaust gas 202, the gas-of-interest absorbs at least some photons of the light within the third wavelength range 214 when the gas-of-interest is present.

The absorption of the photons of the light within the first wavelength range 210 and the light within the second wavelength range 212 by the background gas alters one or more characteristics of the light within the first wavelength range 210 and the light within the second wavelength range 212. Additionally, the absorption of the photons of the light within the third wavelength range 214 by the gas-of-interest alters one or more characteristic of the light within the third wavelength range 214. The characteristics, for example, may include an intensity of the light within the first wavelength range 210, an intensity of the light within the second wavelength range 212, and an intensity of the light within the third wavelength range 214. For example, the absorption of the photons of the light within the first wavelength range 210 may reduce the intensity of the light within the first wavelength range 210. Hereinafter, the light within the first wavelength range 210 characterized by the altered characteristic shall be referred to as a first modified light 234. Again, the light within the second wavelength range 212 characterized by the altered characteristic shall be referred to as a second modified light 236. Similarly, the light within the third wavelength range 214 characterized by the altered characteristic shall be referred to as a third modified light 238.

Accordingly, the irradiation of the exhaust gas 202 by the light within the first wavelength range 210 results in generation of the first modified light 234; the irradiation of the exhaust gas 202 by the light within the second wavelength range 212 results in generation of the second modified light 236, and the irradiation of the exhaust gas 202 by the light within the third wavelength range 214 results in generation of the third modified light 238. The exhaust-gas-duct 206 is further configured to emit the first modified light 234, the second modified light 236, and the third modified light 238 outwards. Particularly, the exhaust-gas-duct 206 includes the second window 220 to emit the first modified light 234, the second modified light 236, and the third modified light 238 outwards.

The system 100 further includes a detector 240 that is operationally coupled to the exhaust-gas-duct 206, the absorption cell 216, and a processing subsystem 242. The detector 240 is configured to receive the first modified light 234, the second modified light 236, and the third modified light 238 from the exhaust-gas-duct 206 and the absorption cell 216. The detector 240 is further configured to determine an intensity 244 of the first modified light 234, an intensity 246 of the second modified light 236, and an intensity 248 of the third modified light 238. Although a single detector is shown for purposes of example, multiple detectors may be used in some embodiments.

The processing subsystem 242 is configured to receive the intensity 244 of the first modified light 234, the intensity 246 of the second modified light 236, and the intensity 248 of the third modified light 238 from the detector 240. Furthermore, the processing subsystem 242 determines a temperature of the exhaust gas 202 based on the intensities of the first modified light 234 and the second modified light 234. Hereinafter, the temperature of the exhaust gas 202 contained in the exhaust-gas-duct 206 shall be referred to as "determined temperature." Computation/determination of the determined temperature shall be explained in greater detail with reference to FIG. 5.

In the presently contemplated configuration, the processing subsystem 242 is further programmed to analyze the exhaust gas 202 at least based on the third modified light 238 and the determined temperature of the exhaust gas 202. Particularly, the processing subsystem 242 is configured to determine a concentration of the gas-of-interest based on the third modified light 248 and the determined temperature of the exhaust gas 202. For example, the processing subsystem 242 may determine the concentration of the gas-of-interest based on the intensity 248 of the third modified light 238 and the determined temperature of the exhaust gas 202. As discussed above with respect to FIG. 1, in one embodiment, the processing subsystem 242 may apply Beer Lambert law to measure the concentration of the gas-of-interest present in the exhaust gas 202 based on the intensity 248 of the third modified light 238.

Figure 3A:
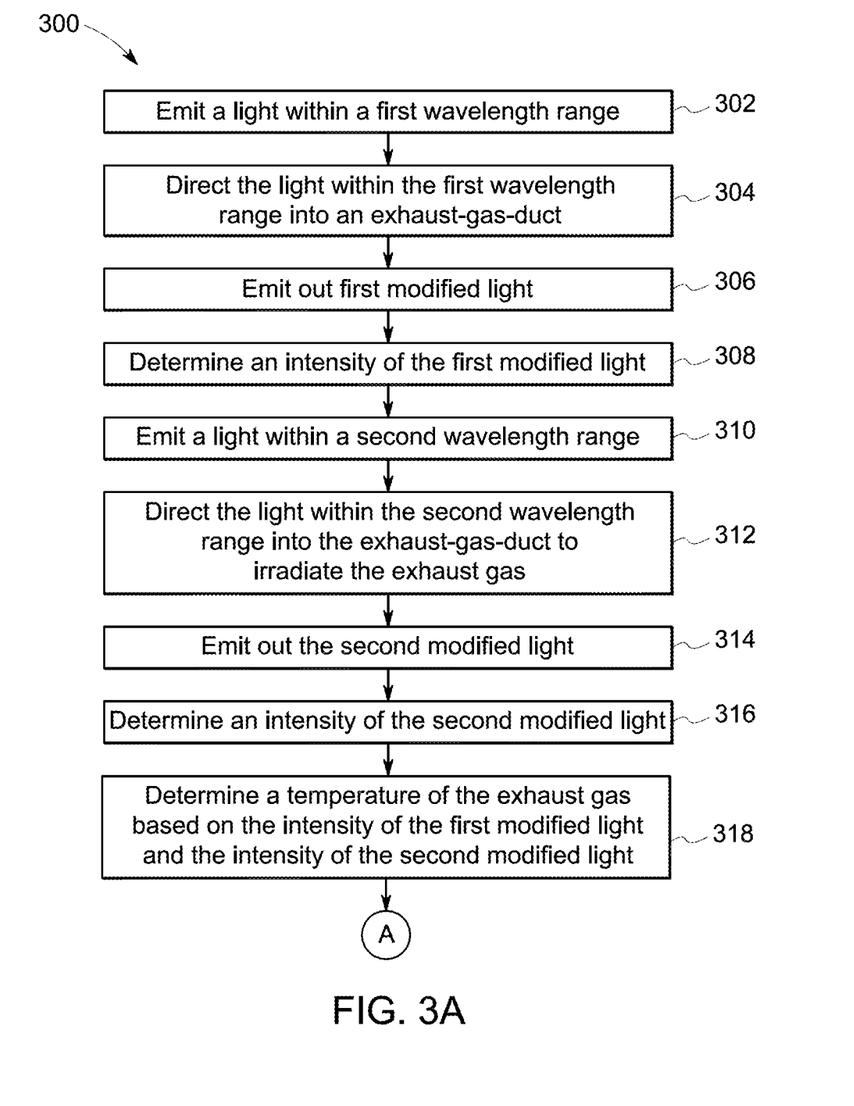
FIG. 3A and FIG. 3B is a flow chart that illustrates an exemplary method for analysis of an exhaust gas in accordance with one embodiment of the present technique.
Figure 3B:
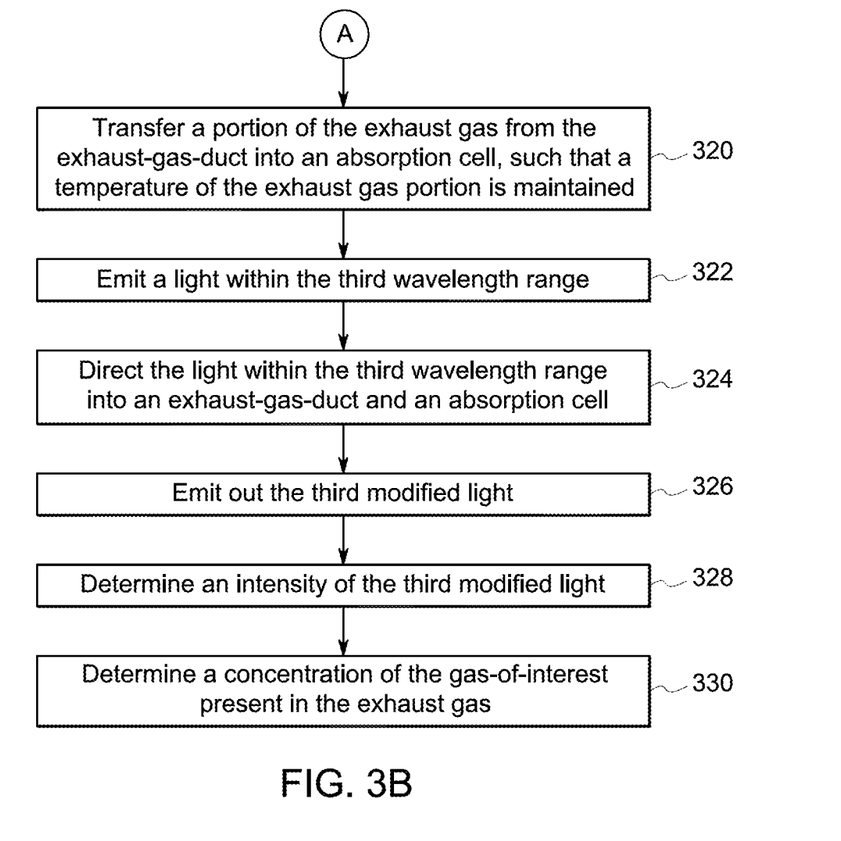

FIG. 3A and FIG. 3B is a flow chart of a method 300 for analyzing a gas in accordance with one embodiment of the present invention. The gas, for example, may comprise an exhaust gas. The exhaust gas may include a gas-of-interest and a background gas. At block 302, a light source emits a light within the first wavelength range. The light within the first wavelength range is characterized by a first absorption wavelength range of the background gas. At block 304, the light within the first wavelength range is directed into an exhaust-gas-duct. The direction of the light within the first wavelength range results in irradiation of the exhaust gas. The irradiation of the exhaust gas results in absorption of photons of the light within the first wavelength range resulting in generation of a first modified light. At block 306, the first modified light is emitted out of the exhaust-gas-duct. Furthermore, at block 308, an intensity of the first modified light is determined. The intensity, for example, may be determined by a detector.

Furthermore, at block 310, a light source emits a light within a second wavelength range. The light within the second wavelength range is characterized by a second absorption wavelength range of the background gas. At block 312, the light within the second wavelength range is directed into the exhaust-gas-duct. The direction of the light within the second wavelength range into the exhaust-gas-duct results in irradiation of the exhaust gas. The irradiation of the exhaust gas results in absorption of photons of the light within the second wavelength range resulting in generation of a second modified light. At block 314, the second modified light is emitted out of the exhaust-gas-duct. Furthermore, at block 316, an intensity of the second modified light may be determined. The intensity of the second modified light, for example, may be determined by a processing subsystem.

At block 318, a temperature of the exhaust gas in the exhaust-gas-duct may be determined based on the intensity of the first modified light and the intensity of the second modified light. Determination of the temperature of the exhaust gas is explained in greater detail with reference to FIG. 5. In one embodiment, when the absorption cell is located outside the exhaust-gas-duct, a portion of the exhaust gas is transferred from the exhaust-gas-duct to an absorption cell at block 320. Hereinafter, the phrase "portion of the exhaust gas" shall be referred to as "exhaust gas portion." The exhaust gas portion is transferred to the absorption cell such that the temperature of the exhaust gas portion is maintained at a temperature level substantially equal the determined temperature of the exhaust gas. In one embodiment, the quantity of exhaust-gas portion may be less than 0.1%.

At block 322, a light source emits a light within the third wavelength range. The light within the third wavelength range is characterized by an absorption wavelength range of the gas-of-interest. At block 324, the light within the third wavelength range is directed into the absorption cell. The direction of the light within the third wavelength range results in irradiation of the exhaust gas portion. The irradiation of the exhaust gas portion results in absorption of photons of the light within the third wavelength range resulting in generation of a third modified light. In one embodiment, the light within the first wavelength range, the light within the second wavelength range, and the light within the third wavelength range may be different light beams characterized by different absorption wavelength ranges. In an alternative embodiment, the light within the first wavelength range, the light within the second wavelength range and the light within the third wavelength range may be a portion of a single light beam, wherein the light within the first, second and third wavelength ranges are characterized by different absorption wavelength ranges.

At block 326, the third modified light is emitted out of the absorption cell. Furthermore, at block 328, an intensity of the first modified light is determined. The intensity, for example, may be determined by a detector. At block 330, a concentration of the gas-of-interest may be determined at least based on the intensity of the third modified light and the determined temperature of the exhaust gas. For example, Beer Lambert law may be used to determine the concentration of the gas-of-interest.

Figure 4A:
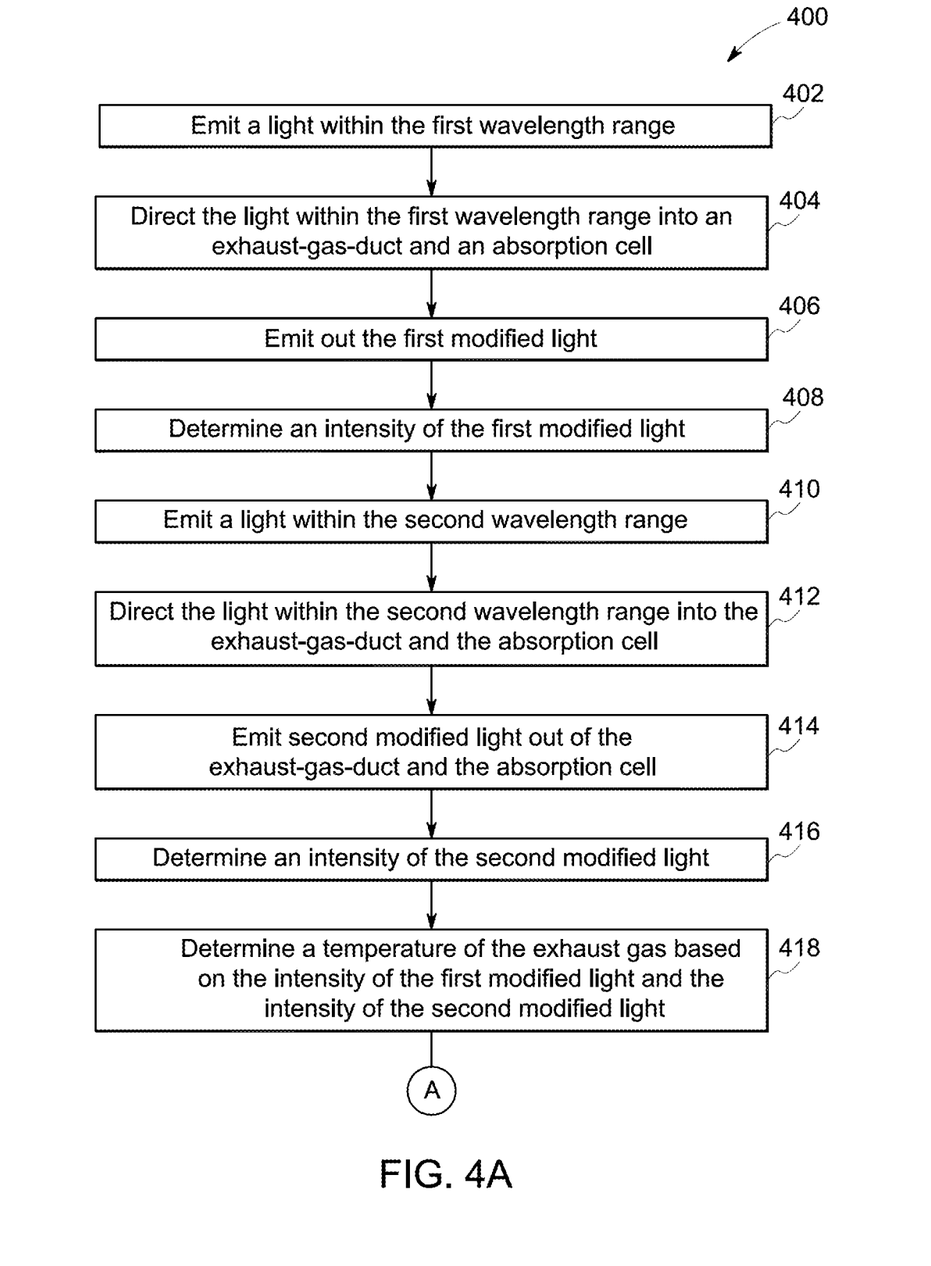
FIG. 4A and FIG. 4B is a flow chart that illustrates an exemplary method for analysis of an exhaust gas in accordance with another embodiment of the present technique.
Figure 4B:
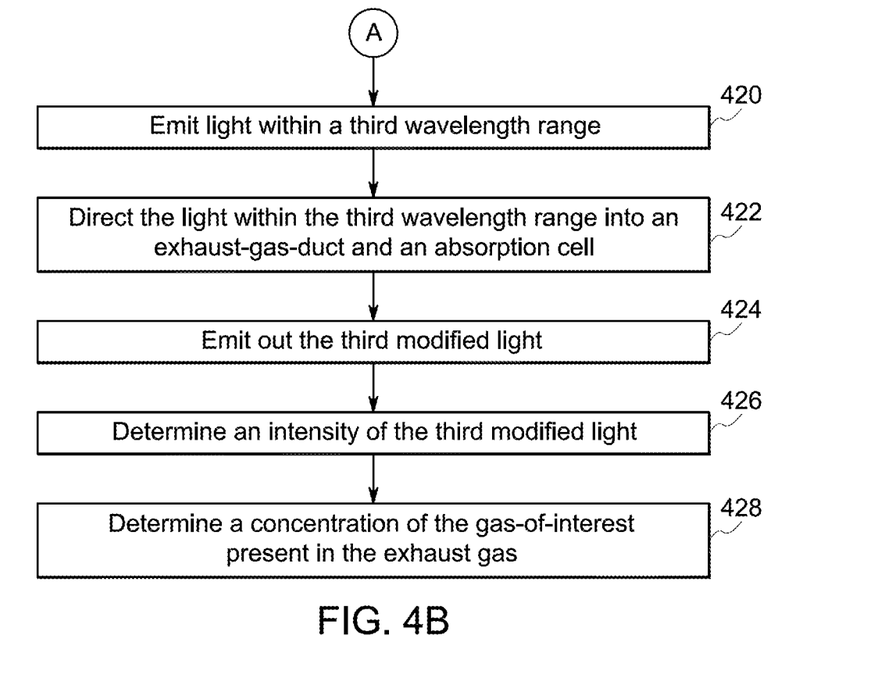

FIG. 4A and FIG. 4B is a flow chart that illustrates an exemplary method 400 for analysis of an exhaust gas in accordance with another embodiment of the present technique. The gas, for example, may comprise an exhaust gas. The exhaust gas may include a gas-of-interest and a background gas.

At block 402, a light source emits a light within the first wavelength range. The light within the first wavelength range is characterized by a first absorption wavelength range of the background gas. At block 404, the light within the first wavelength range is directed into an exhaust-gas-duct and an absorption cell where the absorption cell is located inside the exhaust-gas-duct. The direction of the light within the first wavelength range results in irradiation of the exhaust gas. The irradiation of the exhaust gas results in absorption of photons of the light within the first wavelength range resulting in generation of a first modified light.

At block 406, the first modified light is emitted out of the exhaust-gas-duct and the absorption cell. Furthermore, at block 408, an intensity of the first modified light is determined. The intensity, for example, may be determined by a detector. Furthermore, at block 410, a light source emits a light within the second wavelength range. The second wavelength range is characterized by a second absorption wavelength range of the background gas. At block 412, the light within the second wavelength range is directed into the exhaust-gas-duct and the absorption cell. The direction of the light within the second wavelength range into the exhaust-gas-duct and the absorption cell results in irradiation of the exhaust gas. The irradiation of the exhaust gas results in absorption of photons of the light within the second wavelength range resulting in generation of a second modified light. At block 414, the second modified light is emitted out of the exhaust-gas-duct and the absorption cell. Furthermore, at block 416, an intensity of the second modified light may be determined. The intensity of the second modified light, for example, may be determined by a processing subsystem.

At block 418, a temperature of the exhaust gas in the exhaust-gas-duct and the absorption cell may be determined based on the intensity of the first modified light and the intensity of the second modified light. Determination of the temperature of the exhaust gas is explained in greater detail with reference to FIG. 5. At block 420, a light source emits a light within the third wavelength range. The light within the third wavelength range is characterized by an absorption wavelength range of the gas-of-interest. In one embodiment, the light within the first, second and third wavelength ranges characterized by different absorption wavelength ranges may be different light beams. In an alternative embodiment, the light within the first, second and third wavelength ranges characterized by different absorption wavelength ranges, may be combined into a single light beam. At block 422, the light within the third wavelength range is directed into the exhaust-gas-duct and the absorption cell. The direction of the light within the third wavelength range results in irradiation of the exhaust gas. The irradiation of the exhaust gas results in absorption of photons of the light within the third wavelength range resulting in generation of a third modified light. At block 424, the third modified light is emitted out of the exhaust-gas-duct and the absorption cell. Furthermore, at block 426, an intensity of the third modified light is determined. The intensity, for example, may be determined by a detector.

At block 428, a concentration of the gas-of-interest may be determined at least based on the intensity of the third modified light and the determined temperature of the exhaust gas. For example, Beer Lambert law may be used to determine the concentration of the gas-of-interest.

Figure 5:
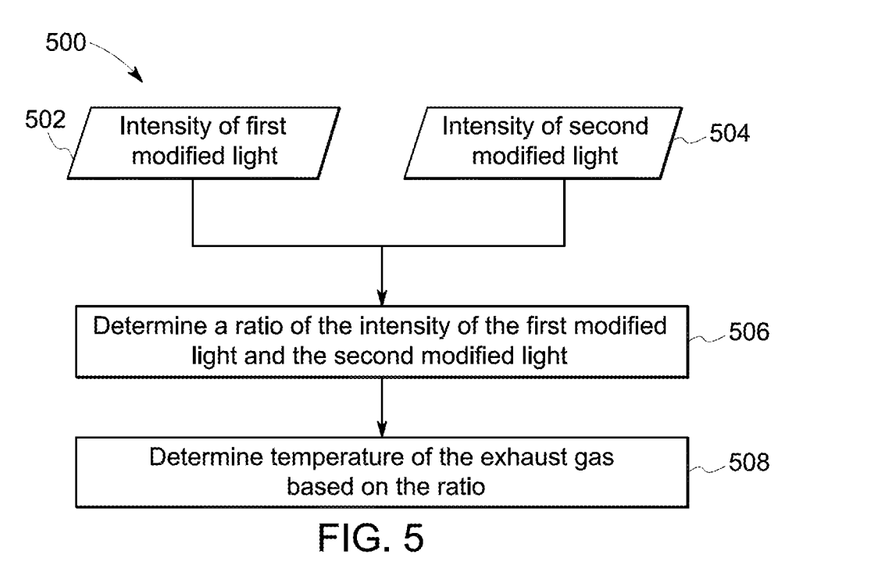
FIG. 5 is a flow chart of a method to determine a temperature of an exhaust gas in accordance with one embodiment of the present technique.

FIG. 5 is a flow chart of a method 500 for determining a temperature of an exhaust gas in accordance with one embodiment of the present systems. Block 502 is representative of an intensity of a first modified light and block 504 is representative of an intensity of a second modified light. At block 506, a ratio of the intensity of the first modified light and the second modified light is determined. Furthermore, at block 508, a temperature of the exhaust gas is determined based on the ratio. For example, the temperature of the exhaust gas may be determined by mapping the ratio to the temperature using a look up table (not shown). In another embodiment, the temperature of the exhaust gas may be determined by inputting the ratio into a transfer function.

The present systems and methods in accordance with the embodiments of the present invention, accurately analyzes exhaust gas irrespective of harsh environment of an exhaust-gas-duct containing the exhaust gas. The exemplary systems and methods constantly maintain the temperature of the exhaust gas during the transfer and analysis of the exhaust gas to obtain accurate analysis results. In certain embodiments, the exemplary systems and methods eliminates the requirement for transfer of the exhaust gas to a remote location, for analysis, by configuring the exhaust-gas-duct to additionally act as an absorption cell. In certain embodiments, the exemplary systems and methods eliminates the requirement for transfer of the exhaust gas to a remote location, for analysis, by installing the absorption cell inside the exhaust-gas-duct.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
    an exhaust-gas-duct configured to receive an exhaust gas comprising a gas-of-interest and a background gas;
    one or more light sources operatively coupled to the exhaust-gas-duct and configured to emit light within first, second, and third wavelength ranges, through the exhaust gas, wherein the first wavelength range is characterized by a first absorption wavelength range of the background gas, wherein the second wavelength range is characterized by a second absorption wavelength range of the background gas, wherein the first and second wavelength ranges are not identical, and wherein the third wavelength range is characterized by an absorption wavelength range of the gas-of-interest;
    one or more detectors operatively coupled to the exhaust-gas-duct and configured to receive the light that has traversed through the exhaust gas from the one or more light sources, wherein at least some of the light within the first, second, and third wavelength ranges is absorbed by the exhaust gas thereby providing modified light for detection characterized by the first, second, and third absorption wavelength ranges;
    a processing subsystem communicatively coupled to the one or more detectors and configured to determine a temperature of the exhaust gas based on the modified light characterized by the first and second absorption wavelength ranges and to determine a concentration of the gas-of-interest based on the modified light characterized by the third absorption wavelength range and the determined temperature of the exhaust gas; and
    an absorption cell located outside the exhaust-gas-duct and configured to receive a portion of the exhaust gas and maintaining the portion of the exhaust gas at a temperature level substantially equal to the determined temperature, wherein the one or more light sources are configured to emit the light within the third wavelength range through the absorption cell.

2. The system of claim 1, wherein the gas-of-interest comprises nitrogen oxide.

3. The system of claim 1, wherein the background gas comprises water, water vapor, or a combination thereof.

4. The system of claim 1, wherein the one or more light sources are configured for emitting the light within the first, second, and third wavelength ranges directly through the exhaust-gas-duct.

5. The system of claim 1, further comprising a coupling unit coupled to the exhaust-gas-duct and the absorption cell, wherein the coupling unit comprises:
    a tube extending from the exhaust-gas-duct to the absorption cell and configured to direct the portion of the exhaust gas from the exhaust-gas-duct to the absorption cell; and
    a first temperature control unit communicatively coupled to the tube and configured to maintain the portion of the exhaust gas at the determined temperature within the tube.

6. The system of claim 5, wherein the absorption cell comprises a second temperature control unit configured to maintain the portion of the exhaust gas at the determined temperature within the absorption cell.

7. The system of claim 1, further comprising an absorption cell located inside the exhaust-gas-duct, and wherein the absorption cell comprises a multi-pass absorption cell.

8. The system of claim 1, wherein the light comprises a combined single light beam.

9. The system of claim 8, wherein the one or more light sources comprise a tunable laser source, a diode laser, a laser, a distributed feedback laser source, or a quantum cascade laser source.

10. The system of claim 1, wherein a concentration of the background gas is at least 2%, and wherein the gas-of-interest is different from the background gas.

11. The system of claim 1, wherein the processing subsystem is further configured to determine the temperature of the exhaust gas within the exhaust-gas-duct based on a ratio of an intensity of the modified light characterized by the first absorption wavelength range and an intensity of the modified light characterized by the second absorption wavelength range.

12. A method, comprising:
 receiving an exhaust gas comprising a gas-of-interest and a background gas;
 emitting light through the exhaust gas, wherein the light is within first, second, and third wavelength ranges, wherein the first wavelength range is characterized by a first absorption wavelength range of the background gas, the second wavelength range is characterized by a second absorption wavelength range of the background gas, wherein the first and second absorption wavelength ranges are not identical, and wherein the third wavelength range is characterized by a third absorption wavelength range of the gas-of-interest;
 receiving light that has traversed through the exhaust gas, wherein at least some of the light within the first, second, and third wavelength ranges is absorbed by the exhaust gas thereby providing modified light for detection within the first, second, and third absorption wavelength ranges;
 determining a temperature of the exhaust gas based on the modified light characterized by the first and second absorption wavelength ranges and determining a concentration of the gas-of-interest based on the modified light characterized by the third absorption wavelength range and the determined temperature of the exhaust gas; and
 receiving a portion of the exhaust gas in an absorption cell and maintaining the portion of the exhaust gas in the absorption cell at a temperature level substantially equal to the determined temperature.

13. The method of claim 12, wherein the light comprises a single combined light beam.

14. The method of claim 12, determining the temperature of the exhaust gas within an exhaust-gas-duct based on a ratio of an intensity of the modified light characterized by the first absorption wavelength range and an intensity of the modified light characterized by the second absorption wavelength range.

15. The method of claim 12, wherein the gas-of-interest comprises nitrogen oxide.

16. The method of claim 12, wherein the background gas comprises water, water vapor, or a combination thereof.

17. A system comprising:
 an exhaust-gas-duct configured to receive an exhaust gas comprising water, water vapor and nitrogen oxide;
 one or more light sources operatively coupled to the exhaust-gas-duct and configured to emit light within first, second, and third wavelength ranges, through the exhaust gas, wherein the first wavelength range is characterized by a first absorption wavelength range of the water or water vapor, wherein the second wavelength range is characterized by a second absorption wavelength range of the water or water vapor, wherein the first and second wavelength ranges are not identical, and wherein the third wavelength range is characterized by a third absorption wavelength range of the nitrogen oxide;
 one or more detectors operatively coupled to the exhaust-gas-duct and configured to receive the light that has traversed through the exhaust gas from the one or more light sources, wherein at least some of the light within the first, second, and third wavelength ranges is absorbed by the exhaust gas thereby providing modified light for detection characterized by the first, second, and third absorption wavelength ranges;
 a processing subsystem communicatively coupled to the one or more detectors and configured to determine a temperature of the exhaust gas based on the modified light characterized by the first and second absorption wavelength ranges and to determine a concentration of the nitrogen oxide based on the modified light characterized by the third absorption wavelength range and the determined temperature of the exhaust gas; and
 an absorption cell located outside the exhaust-gas-duct and configured to receive a portion of the exhaust gas and maintaining the portion of the exhaust gas at a temperature level substantially equal to the determined temperature, wherein the one or more light sources are configured to emit the light within the third wavelength range through the absorption cell.

* * * * *